United States Patent [19]
Maggio

[11] 3,762,980
[45] Oct. 2, 1973

[54] MACHINE FOR MAKING MULTI-PLY BELTS FOR WAISTBAND CONSTRUCTION

[75] Inventor: Joseph P. Maggio, Farmingdale, N.Y.

[73] Assignee: Elastic Systems Corporation, Farmingdale, N.Y.

[22] Filed: Feb. 22, 1971

[21] Appl. No.: 117,324

[52] U.S. Cl............ 156/461, 156/202, 156/204, 156/443, 156/459, 156/548
[51] Int. Cl............................................ B31f 1/00
[58] Field of Search............... 156/459, 461, 463, 156/464, 199–204, 291, 216, 196, 227; 161/99; 223/34, 52, 52.6; 2/338, 76; 270/44, 93; 264/285

[56] References Cited
UNITED STATES PATENTS

| | | | |
|---|---|---|---|
| 253,428 | 2/1882 | Ridgway | 156/463 |
| 1,931,333 | 10/1933 | Taylor | 156/463 X |
| 2,657,161 | 10/1953 | Luitwieler | 156/216 X |
| 2,828,796 | 4/1958 | Loew | 2/338 X |
| 3,118,803 | 1/1964 | Lynam | 156/463 X |
| 3,250,657 | 5/1966 | Winberg | 156/227 X |
| 3,306,328 | 2/1967 | Markus | 156/227 X |
| 3,346,941 | 10/1967 | Patry et al | 156/461 X |

Primary Examiner—Alfred L. Leavitt
Assistant Examiner—David A. Simmons
Attorney—Stoll and Stoll

[57] ABSTRACT

1. A method of making multi-ply rubber core-knit fabric sheath belts used in garment waistband construction, said method comprising the steps of folding and creasing a knit fabric strip to form a closed sheath, feeding a rubber core, consisting of at least one rubber strip, to said sheath, opening said sheath to receive said rubber core, applying a bonding agent between said rubber core and said open sheath, closing said sheath upon said rubber core, and applying heat and pressure to said closed sheath to set the bonding agent and thereby bond the sheath and rubber core together.

2. A machine for performing the above listed method steps, said machine comprising folding and creasing means for folding and creasing a knit fabric strip to form a closed sheath, feeding means for feeding a rubber core, consisting of at least one rubber strip, to said sheath, unfolding means for opening the closed sheath to receive said rubber core, applicator means for applying a bonding agent between said rubber core and said open sheath, refolding means to close the sheath upon the rubber core, and heating and pressure applying means for applying heat and pressure to the closed sheath to set the bonding agent and thereby bond the sheath and rubber core together.

5 Claims, 18 Drawing Figures

MACHINE FOR MAKING MULTI-PLY BELTS FOR WAISTBAND CONSTRUCTION

BACKGROUND OF THE INVENTION

1. Field of the Invention

This invention relates to the construction of elastic waistbands for garments such as pajamas and boxer shorts.

2. Description of the Prior Art

The closest art known to applicant is shown in the following patents: U.S. Pat. Nos. 2,112,892 to Hardie; 2,113,201 to Scheitlin; 2,138,453 to Joyce; 2,277,227 to Hardie; 2,590,616 to Heller; 2,617,113 to Hardie; 2,619,648 to Hardie; 2,708,274 to Vander; 2,751,599 to Peterson; 2,757,381 to Cottier; 3,040,330 to Hardie; 3,064,269 to Scheitlin; 3,078,469 to Lynam; 3,118,803 to Lynam; British Pat. Nos. 859,868, Jan. 25, 1961; 913,692, Dec. 28, 1962; 918,096, Feb. 13, 1963; and 1,111,786, May 1, 1968.

As is indicated in applicant's co-pending patent application, Ser. No. 117,297 (filed jointly with Herbert Richter, joint inventor) and as is shown in the above-cited patents, laminated elastic belts for garment waistband use, that is, rubber cored - knit fabric sheathed belts, are known to the art. Methods and machines for making such belts are also known to the art. See, particularly, Lynam U.S. Pat. No. 3,118,803.

However, in all cases known to applicant, the belts are all permanently laminated, that is, the laminations are made to last for the life of the garment, and the means and methods for making such belts are directed accordingly. Thus, Lynam U.S. Pat. No. 3,118,803 utilizes an adhesive to secure the rubber core to the fabric sheath, the adhesive is applied directly to the rubber core, and multiple applicators are employed to apply the adhesive to both sides of the rubber core.

SUMMARY OF THE INVENTION

As is stated in co-pending patent application Ser. No. 117,297, it has been discovered that permanent rubber-knit fabric laminations interfere with the proper functioning of the waistbands. It is important, according to the findings which are set forth in said co-pending patent application, that the rubber core and the knit fabric sheath be separate and free from each other, except for the stitching which attaches them both to the garment, when the garment is worn on the person. However, it is also important, for manufacturing purposes, that the rubber core and knit fabric sheath be temporarily attached to each other, that is, held together long enough to be sewn to the garment.

Accordingly, the invention of said co-pending patent application is to provide a rubber cored - knit fabric sheathed belt wherein the rubber core and the knit fabric sheath are separably attached to each other by means of a temporary bond, that is, a bond which is sufficient to hold them together while they are sewn to the garment, but insufficient to hold them together after they are sewn to the garment and under conditions of normal use and laundering thereof.

The importance of a temporary bond to hold the rubber core and knit fabric sheath together for the sewing operation is magnified when the rubber core consists of a plurality of separate rubbers strips. In one preferred embodiment of the invention set forth in said co-pending patent application four rubber strips are incorporated into a single waistband. If they were not temporarily bonded to the knit fabric sheath, it would be necessary to supply, handle, feed, guide and sew five separate strips of material, four of rubber and one of knit fabric. This would be a difficult, time-consuming and costly procedure which garment manufacturers would not countenance. To adopt the teaching of the prior art and to provide a permanent bond between the rubber core and the knit fabric sheath would solve this manufacturing problem, but it would produce an unsatisfactory garment.

It is the object of the present invention to provide a method and means for making a rubber cored - knit fabric sheathed belt wherein the bond between the rubber core and the knit fabric sheath is sufficient to hold them together for the purposes and duration of the sewing operation (whereby they are sewn to the garment), but insufficient to hold them together under conditions of normal use and laundering of the garment.

DESCRIPTION OF A PREFERRED EMBODIMENT OF THE INVENTION

The present invention presupposes the availability of long continuous knit fabric strips 10 and rubber strips 12 of any desired or required cross-sectional dimensions. They may be fed from conventional rolls or from festooned lengths or in any other manner known to the art. Illustrative is the box of festooned rubber stripping designated by the reference numeral 14, said stripping having been festooned on the festooning machine which is shown and described in applicant's co-pending patent application Ser. No. 117,297.

The machine which is herein claimed includes a frame 16 and sub-frame mounted thereon to support the individual sections of the machine. Supported by the framework is a plurality of horizontal bars 20, 20a, 20b and longitudinal bars 21 which support and guide the knit fabric strip from its source to a heated horizontal plate 22. The heat source is conventional and may consist of electrical resistance heater 24 or any other suitable and available heating means such as steam. Here the knit fabric strip is heated and prepared or preconditioned for the folding and creasing operations.

Figure 10:
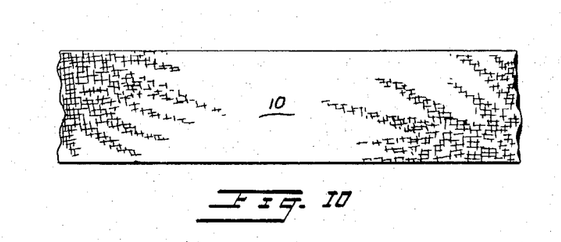
FIG. 10 is a fragmentary plan view of the knit fabric strip before it is folded and creased to form a sheath.

The knit fabric strip reaches and leaves the horizontal heating plate spread out flat as viewed in FIG. 10. After it leaves the horizontal heating plate, it passes through a folder 26 wherein the side edges of the fabric strip are folded over to form a pair of relatively narrow side flaps 10a, 10b extending across at least part of relatively wide inner panel 10c of the knit fabric strip.

At this stage of the process side flaps 10a and 10b are joined to inner panel 10c along a pair of fold lines formed in folder 26. The folded knit fabric strip now passes between and over a pair of calender rolls 28 and 30, and it is there exposed to both heat and pressure. Rolls 28 and 30 or either of them may be heated externally, as by infra-red lamps 32, or internally, as by electrical resistance coils or steam.

Figure 11:
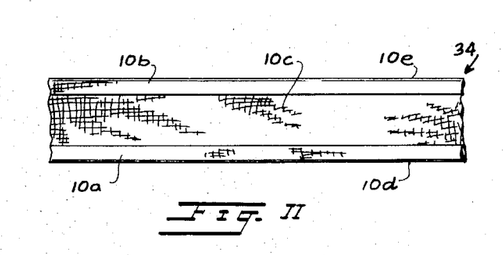
FIG. 11 is a similar view showing the side edges of the knit fabric strip folded over, and the fold lines creased, to form a sheath having an inner panel and superimposed side flaps.

Sufficient heat and pressure are applied to the folded knit fabric strip, when it passes between and over calender rolls 28, 30, to convert the fold lines into crease lines 10d and 10e. The folded knit fabric strip is now formed into a closed knit fabric sheath 34 as shown in FIG. 11.

Figure 12:
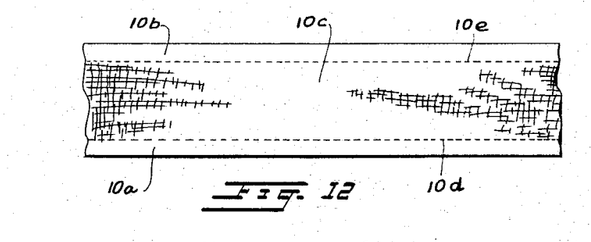
FIG. 12 is still another fragmentary plan view, showing the side flaps unfolded and the sheath thereby opened.

After the knit fabric strip (now in the form of closed sheath 34) leaves the calender rolls 28, 30, it passes across bars 36 and 38 and thence under bar 40 and over bar 42 and between longitudinal guide bars 21 to bonding agent applicator 44. This has the effect of unfolding side flaps 10a, 10b of the sheath and thereby opening said sheath to produce the flat condition depicted in FIG. 12. Creases 10d and 10e remain, but the side flaps are not folded over along them.

Figures 2, 6, 7:
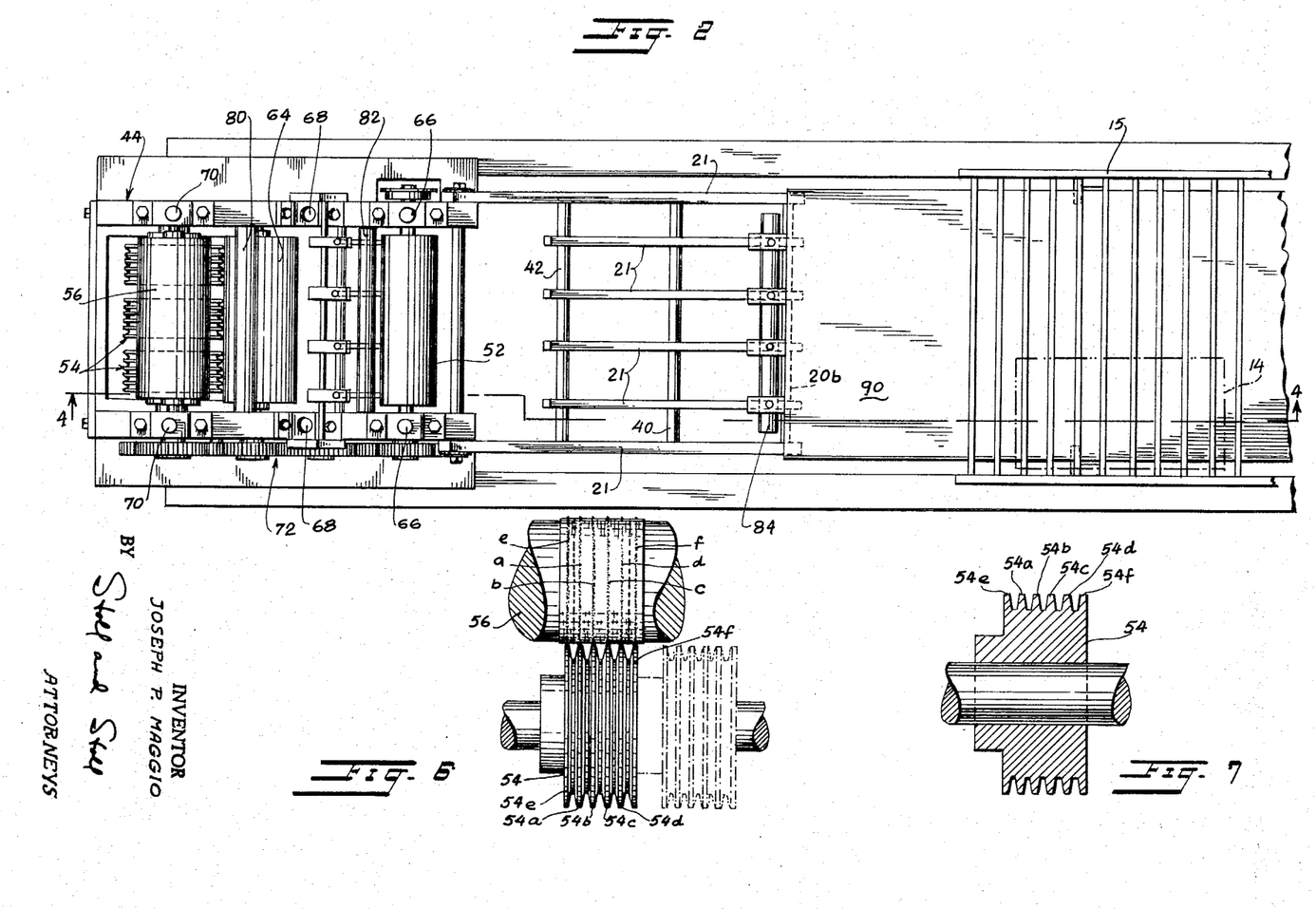
FIG. 2 is a plan view thereof.
FIG. 6 is a perspective view of the knit fabric folding means.
FIG. 7 is a fragmentary enlarged view of the bonding agent applying means.
Figure 3:
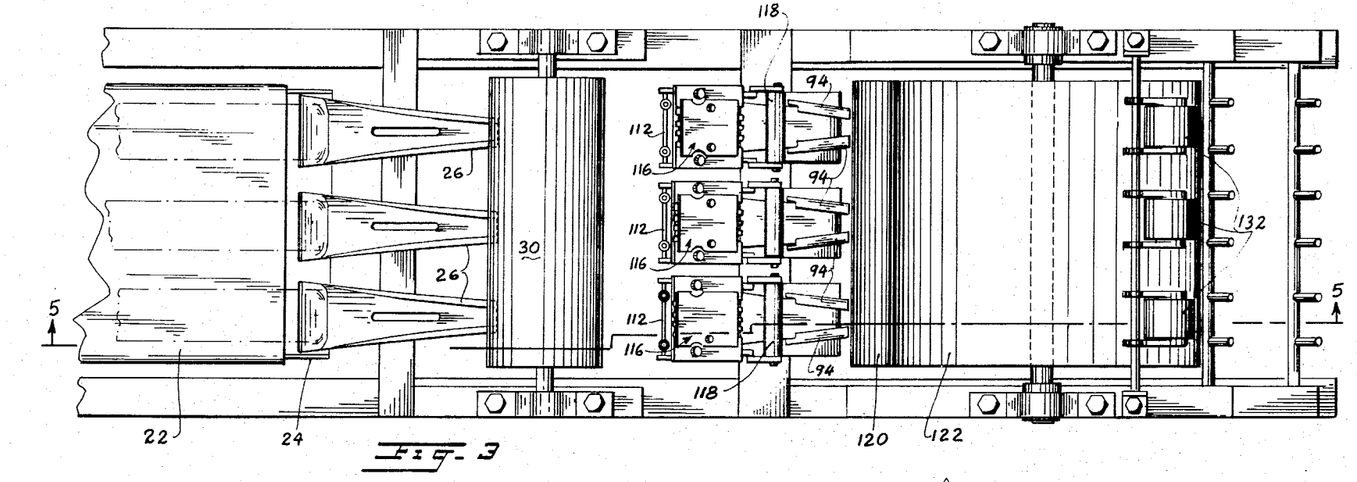
FIG. 3 is a fragmentary enlarged view of the knit fabric folding, creasing and refolding, rubber core feeding, and heat and pressure applying stations of the machine.

To insure the flat state of the knit fabric strip, said strip passes between a pair of rollers 50, 52. It then passes between applicator roll 54 and pressure roll 56, where the bonding material is applied to said strip. As is shown in FIG. 7, the applicator roll has a plurality of annular ribs which function as the means for applying the bonding material to the knit fabric strip. The number of such annular ribs is determined by the number of lines of bonding material which it is desired to apply to the knit fabric strip. In the illustrated form of the invention, as in one preferred form of the invention disclosed and claimed in above-mentioned co-pending patent application Ser. No. 117,297, four rubber strips 12 are applied to the knit fabric sheath and two of them are covered by the side flaps of said sheath. Four lines a, b, c and d of bonding material 60 are used to separably attach the four rubber strips to the inner panel 10c of the sheath. Two additional lines e and f of bonding material 60 are used to separably attach the side flaps of the sheath to the two outer rubber strips.

Accordingly, in the illustrated form of the invention applicator roll 54 is provided with six annular ribs 54a, 54b, 54c, 54d, 54e and 54f (in the sequence of the bonding material lines a, b, c, d, e and f) and these annular ribs transfer the bonding material 60 from tank 62 to knit fabric strip 10 in the form of the six bonding material lines a, b, c, d, e and f. This occurs when the applicator roll is caused to rotate in said tank, its annular ribs dipping into the bonding material and becoming coated therewith. An adjustable metering roll 64 is used in conjunction with the applicator roll to meter the quantity of bonding material which it picks up and transfers. Pressure roll 56 is also adjustably mounted relative to applicator roll 54 for metering purposes.

Figure 1:
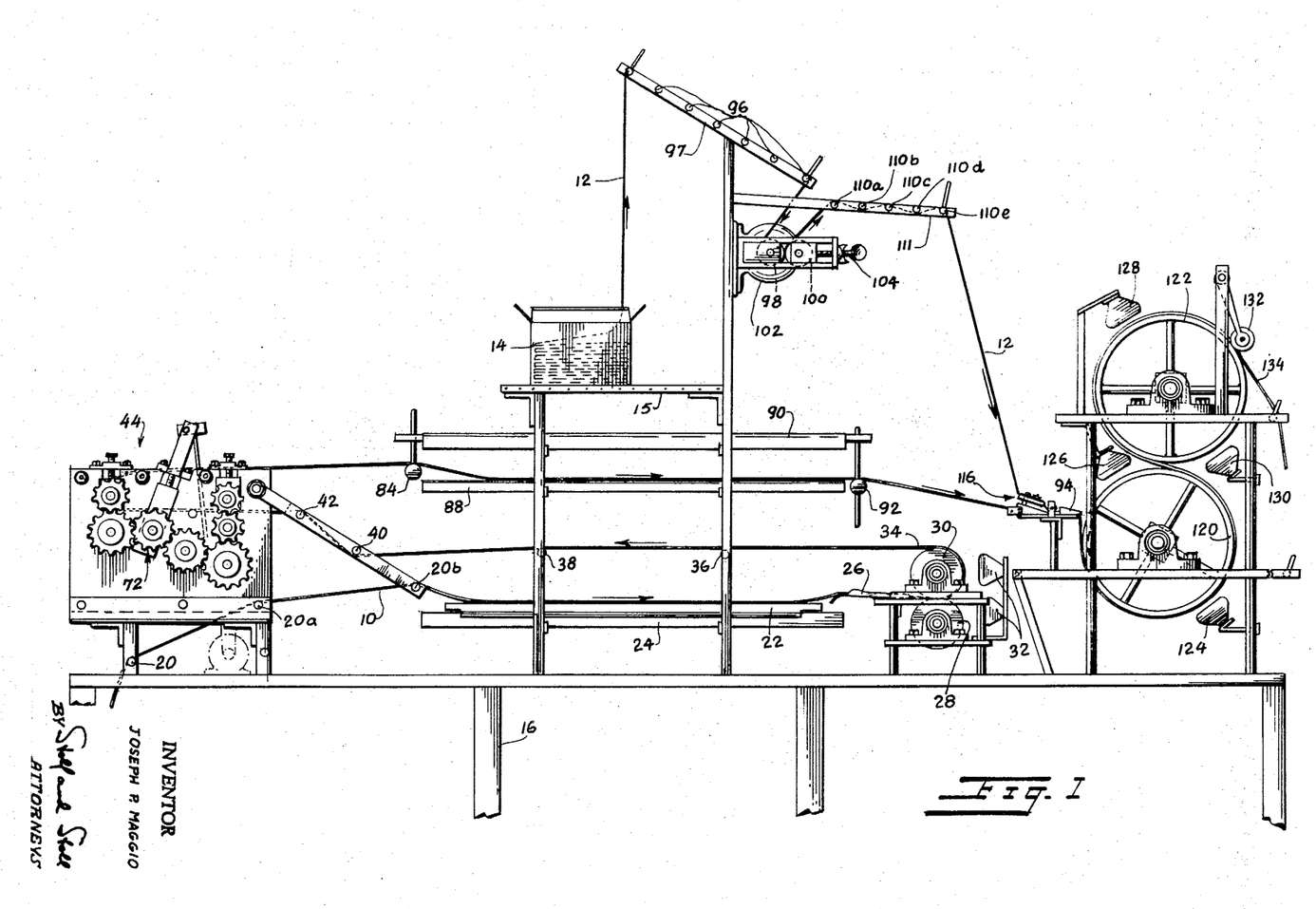
FIG. 1 is a side view of a machine made in accordance with the present invention.
Figure 4:
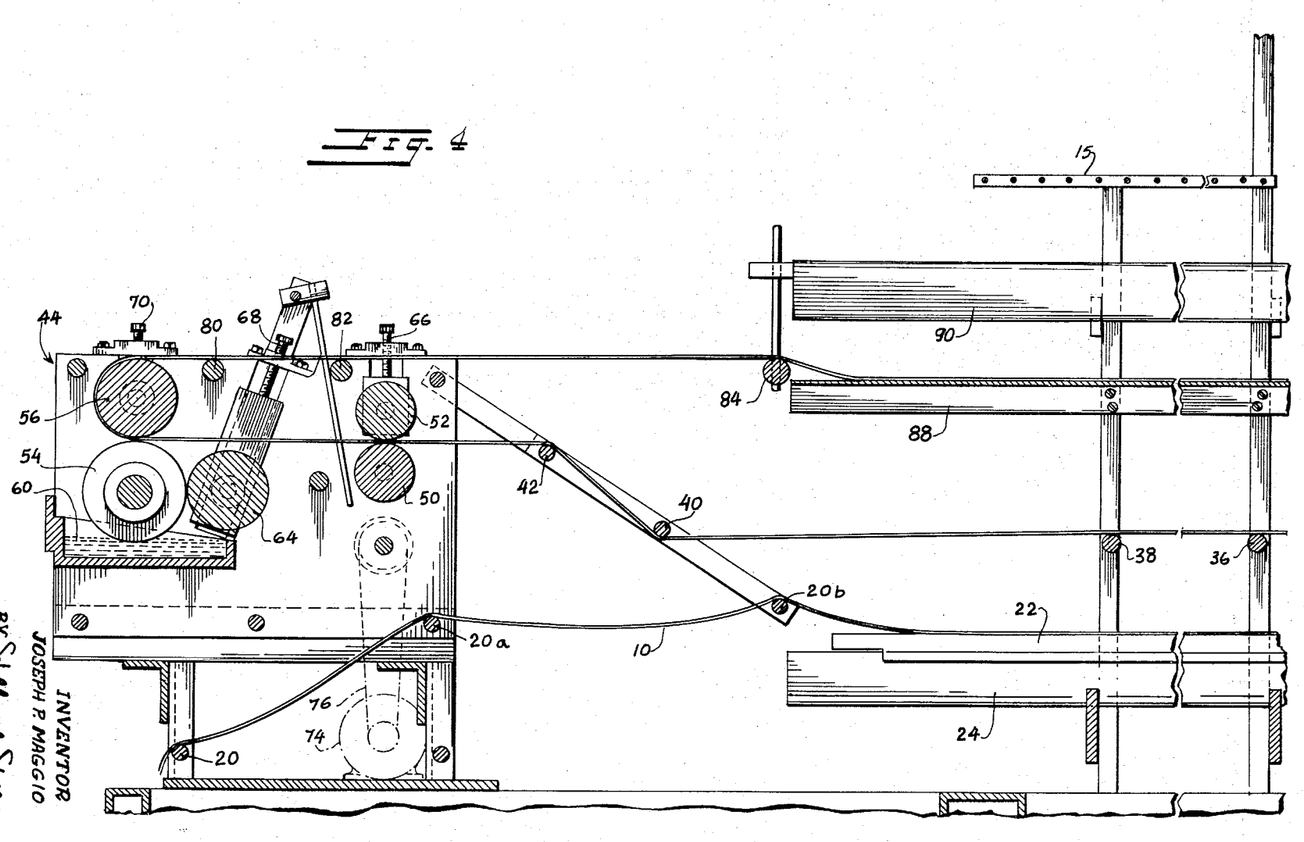
FIG. 4 is a fragmentary enlarged vertical section on the line 4—4 of FIG. 2, showing the knit fabric feeding and opening, and bonding agent applying stations of the machine.
Figure 5:
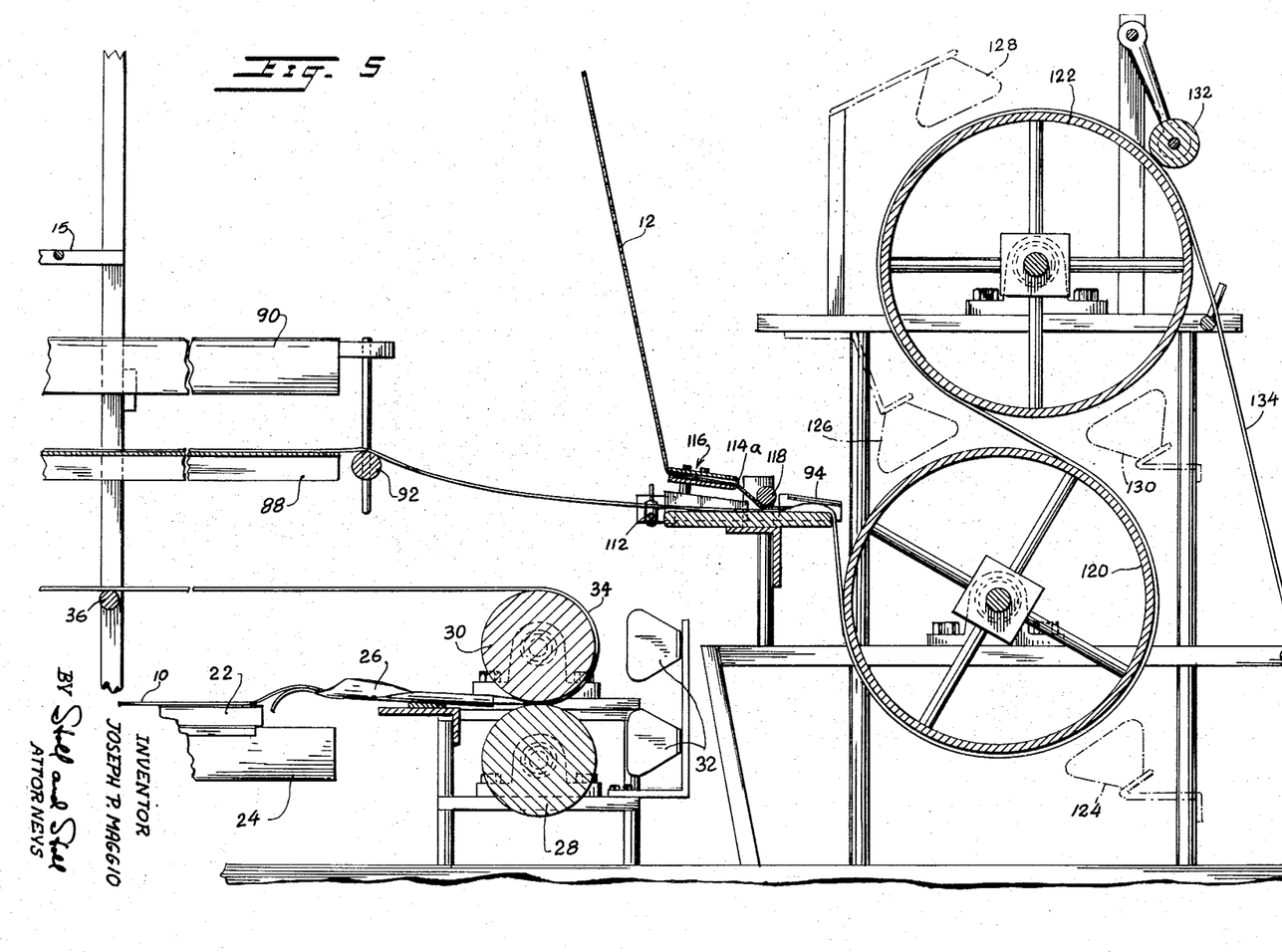
FIG. 5 is a fragmentary enlarged vertical section on the line 5—5 of FIG. 3 and continuous with the section of FIG. 4, showing the knit fabric folding, rubber core feeding, knit fabric refolding, and heat and pressure applying stations of the machine.
Figure 8:
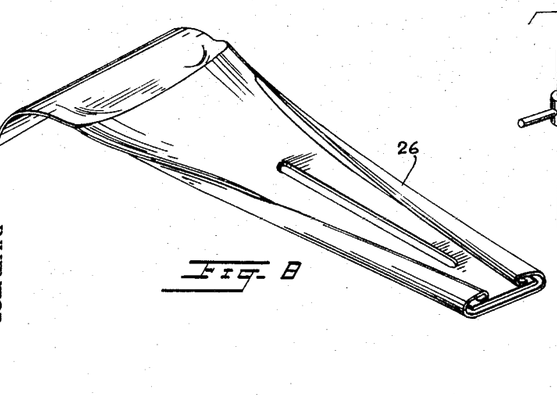
FIG. 8 is a sectional view through said bonding agent applying means.
Figure 9:
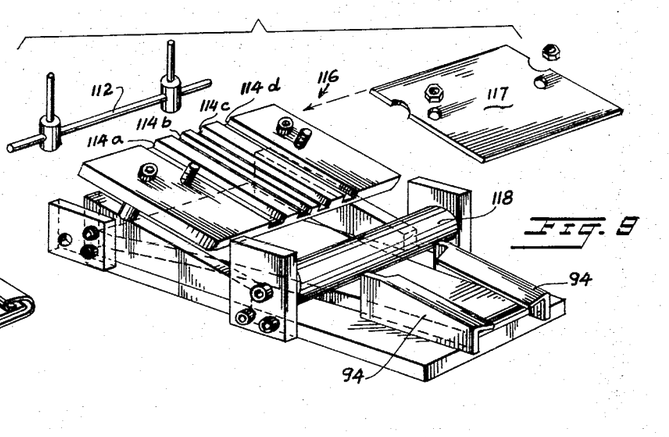
FIG. 9 is an exploded, perspective view of the rubber core feeding and knit fabric refolding means.

As appears in FIG. 4, a screw adjustment 66 is connected to roll 52, a second screw adjustment 68 is connected to metering roll 64, and a third screw adjustment 70 is connected to pressure roll 56. These screw adjustments are conventional and need not be described except to indicate that operation of screw adjustment 66 in one direction will relieve pressure between rolls 50 and 52, while operation in the other direction will increase such pressure; operation of screw adjustment 68 in one direction will relieve the pressure between rolls 54 and 64, while operation in the opposite direction will increase such pressure; and finally that operation of screw adjustment 70 in one direction will relieve the pressure between rolls 54 and 56, while operation in the opposite direction will increase such pressure. Rolls 50, 52, 54 and 56 are caused to rotate, and their rotation is synchronized by means of the gear drive mechanism 72 shown in FIG. 1. Motive power is supplied by an electric motor 74, which drives the gear train through a belt 76. All of this is conventional and need not be described.

Figure 13:
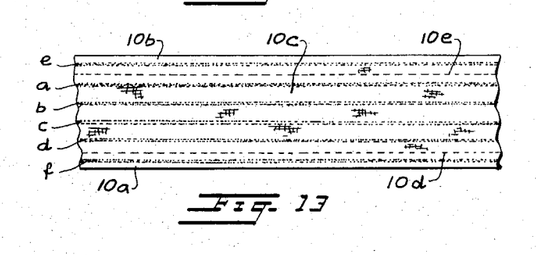
FIG. 13 is a fragmentary plan view showing the open sheath with the bonding agent applied thereto.

The condition of the knit fabric sheath at this stage of the process is shown in FIG. 13. The sheath is spread out in open position, the bonding material is coated thereon in the form of six lines a, b, c, d, e and f, and the sheath is now ready for the next step in the process. It passes around pressure roll 56 and thence across bars 80, 82 and 84 and then onto supporting plate 88. Above this plate is an electrical resistance heater 90 or any other conventional heating means. The heat which is here applied to the knit fabric is sufficient only to begin the curing phase of the bonding agent; it is not sufficient to remove the creases from said fabric.

The knit fabric strip now passes from said supporting plate 88, across bar 92 and into folder 94. Here the fabric strip is re-folded along the previously formed crease lines, but first it is necessary to feed the rubber strips 12 thereto. This is accomplished by drawing the rubber strips from a box 14 or other source of supply mounted on a platform 15 supported by frame 16 of the machine. All four strips may be drawn from a single box (as shown) or from as many separate boxes as there are individual rubber strips 12. The rubber strips are then conducted across transverse support bars 96 and between longitudinal guide bars 97 to the rubber strip feed station of the machine. Support bars 96 help to smooth and equalize the flow of the rubber strips toward that station. The rubber strip feed station consists of feed roll 98 and pressure roll 100. Feed roll 98 is driven by motor 102 and pressure roll 100 is adjustably mounted relative to feed roll 98 by means of screw adjustment 104. The rubber strips pass between said rolls, and they are thereby drawn out of box 14 and fed toward the next station in the machine.

After the rubber strips leave rolls 98 and 100, they pass alternatively over and under bars 110a–110e, inclusive, and between guide bars 111 in order to meter and smooth their flow. They then pass above bar 112 and through channels 114a–114d, inclusive, of guide 116, being confined to said channels by cover plate 117. These guide channels direct the rubber strips toward the knit fabric sheath as it passes through folder 94 and bar 118 applies them to the inner panel of said sheath, in contact with bonding material lines a, b, c and d. As the sheath continues to move through the folder, together with the rubber strips which are now deposited thereon, the side flaps of said sheath are refolded along their original crease lines until they cover the two outer rubber strips, thereby bringing bonding material lines e and f on said side flaps into contact with said outer rubber strips. It will here be noted that at no point in the above-described sequence of operations has the bonding material been brought into contact with any part of the machine following its application to the knit fabric strip.

Figure 14:
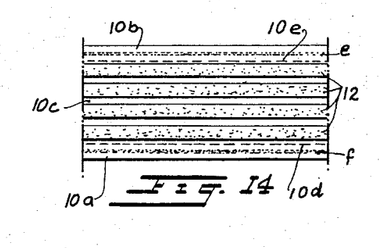
FIG. 14 is a view similar to that of FIG. 13 but showing the rubber strips laid upon the open knit fabric sheath in contact with the bonding agent applied thereto.
Figures 15, 16:
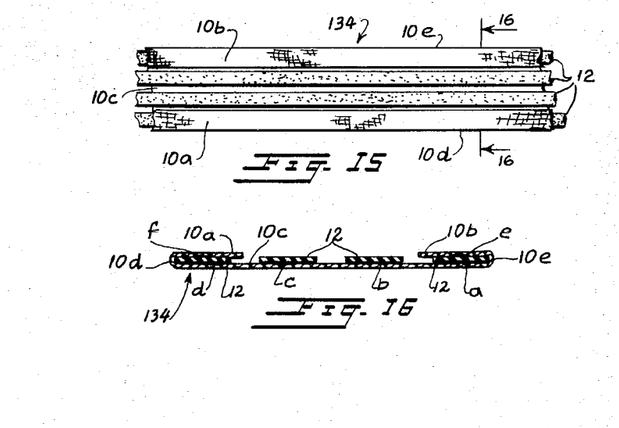
FIG. 15 is a similar view showing the side flaps refolded to close the sheath and thereby to cover two of the rubber strips.
FIG. 16 is an enlarged cross section on the line 16—16 of FIG. 15.
Figures 17, 18:
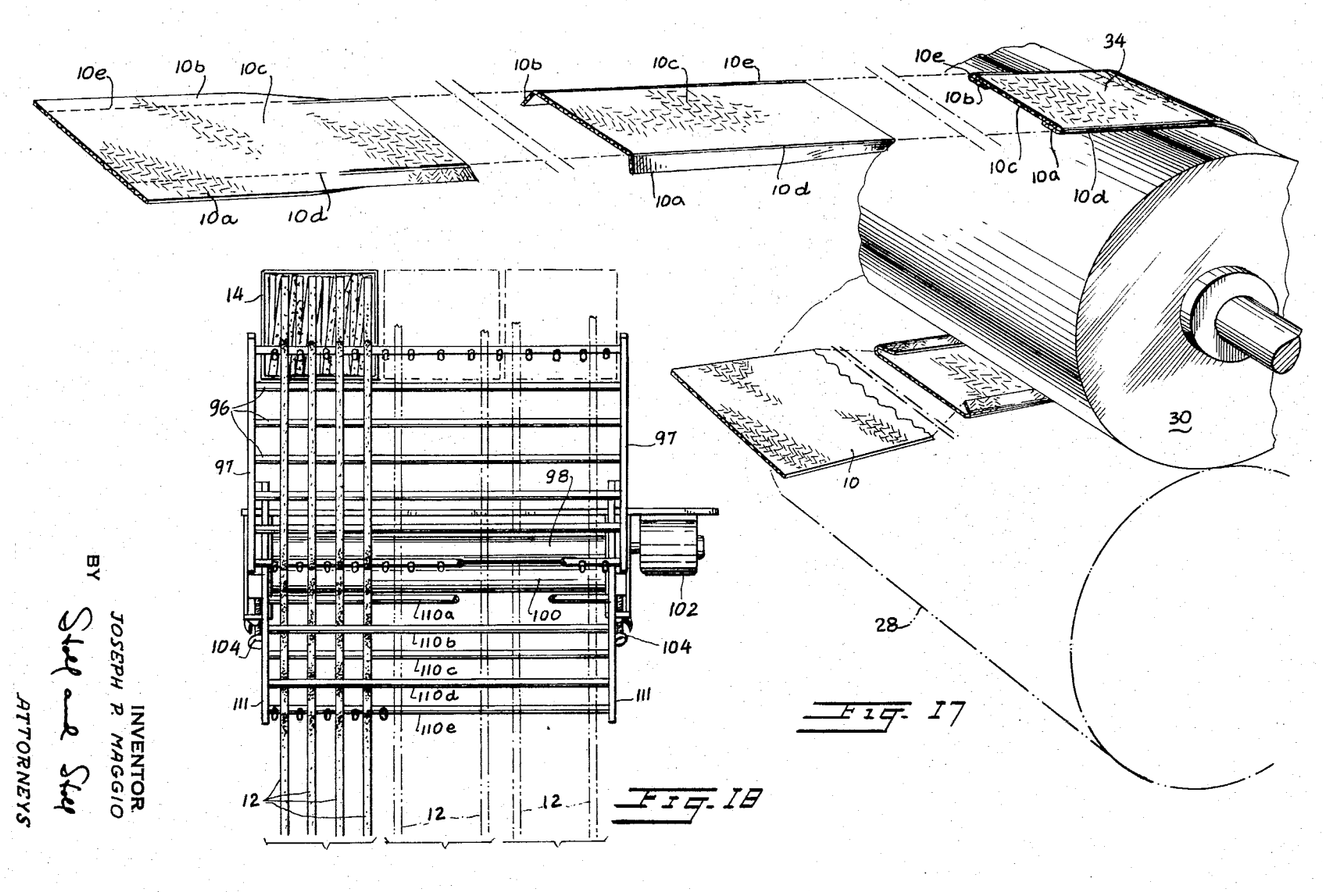
FIG. 17 is an enlarged fragmentary perspective view showing the steps of creasing the folded knit fabric strip to form a closed sheath and then unfolding and thereby opening said sheath without removing the crease lines.
FIG. 18 is an enlarged top view showing a plurality of transverse support and guide bars for the rubber strips, including bars which meter the flow of the rubber strips.

FIG. 14 shows the condition of the knit fabric sheath before the re-folding operation last described and after the rubber strips have been laid thereon. Actually, this is an exaggerated view intended to illustrate this phase of the process. The rubber strips are not necessarily in contact with the open knit fabric sheath for the distance indicated in FIG. 14. Such contact may be relatively brief before the side flaps of the sheath are folded over upon the outer rubber strips and, indeed, it is entirely feasible to lay the rubber strips onto the knit fabric sheath at the same time that the folding of its side flaps commences. This is purely a matter of machine design, and it is immaterial whether one method or another is employed at this stage of the process. Regardless of the time sequence of these two operations (the laying of the rubber strips and the re-folding of the side flaps), the resultant condition is shown in FIGS. 15 and 16 of the drawing. It is at this stage of the process that heat and pressure are again applied to the sheath, this time to set the bonding material and to cause a temporary bond to form between the rubber strips and the knit fabric sheath.

The last mentioned stage in the process is performed by passing the now closed sheath around roller 120 and then around roller 122, while exposing said sheath and its rubber core and bonding agent to the heat generated by infra-red lamps 124, 126, 128 and 130, respectively. These heat lamps are purely illustrative of the many forms of heating elements which may be used for the purpose.

It will also be noted that one or more pressure rollers 132 hold the closed sheath in contact with roll 122 and thereby provide the final pressure necessary, in conjunction with the heat, to complete the process. The result is a rubber cored-knit fabric sheathed belt 134 which may be fed to a collecting bin or any other conventional receiving means.

In order to achieve the temporary bond between the rubber core and the knit fabric sheath, which is the object of this invention, it is necessary to use a bonding material or agent which does not permanently bond these component parts together. The specifications of such bonding material as set forth in above mentioned co-pending patent application Ser. No. 117,297 are incorporated herein by reference. It is sufficient to state that natural or synthetic latex may be used for the purpose. A preferred material is a heat-reactive, self-curing nitrile latex. An anti-wetting agent may also be used to prevent the volatile solvents in such latex from significantly dissolving the surface of the rubber strips. Illustrative of such anti-wetting agents is the talc powder which is conventionally used in the rubber industry to coat rubber products.

The foregoing is illustrative of a preferred form of this invention, and it will be understood that this form may be modified and varied within the broad principles of the invention as above described and within the broad scope of the appended claims.

I claim:

1. A machine for making multi-ply rubber-fabric belts used in garment waistband construction, said machine comprising:
   a. first feed means for feeding a continuous strip of knit fabric,
   b. first fold means for folding the side edges of said knit fabric strip along parallel longitudinal fold lines to form a pair of side flaps covering at least a part of the main body of said knit fabric strip,
   c. first heat and pressure applicator means for applying heat and pressure to said knit fabric strip to transform the fold lines into crease lines and thereby to form a closed fabric sheath,
   d. means for opening said closed fabric sheath to expose its inner surface without removing the crease lines therefrom,
   e. second feed means for feeding a continuous rubber core to said exposed inner surface of the fabric sheath,
   f. applicator means for applying a bonding agent between said exposed inner surface of the fabric sheath and said rubber core,
   g. second fold means for refolding said fabric sheath along said crease lines and thereby closing the sheath and causing its side flaps to cover at least part of the rubber core, and
   h. second heat and pressure applicator means for applying heat and pressure to said closed sheath and thereby setting the bonding agent and bonding the rubber core to the fabric sheath.

2. A machine in accordance with claim 1, wherein:
   a. the bonding agent applicator means applies the bonding agent to the exposed inner surface of the fabric sheath between the side flaps, and
   b. also applies the bonding agent to the corresponding exposed surfaces of the side flaps.

3. A machine in accordance with claim 1, wherein:
   a. the rubber core consists of a plurality of rubber strips,
   b. a plurality of guide means being provided to guide said rubber strips, in spaced, parallel relationship, to the exposed inner surface of the fabric sheath.

4. A machine in accordance with claim 4, wherein:
a. the rubber core consists of a plurality of outer and inner rubber strips,
b. said first fold means being adapted to fold so much of the side edges of the knit fabric strip as would cover the outer rubber strips.

5. A machine for making multi-ply rubber-fabric belts used in garment waistband construction, said machine comprising:
a. folding and creasing means for folding and creasing a knit fabric strip to form a closed sheath,
b. feeding means for feeding a rubber core, consisting of at least one rubber strip, to said sheath,
c. unfolding means for opening the closed sheath to receive said rubber core,
d. applicator means for applying a bonding agent between said rubber core and said open sheath,
e. refolding means to close the sheath upon the rubber core, and
f. heating and pressure applying means for applying heat and pressure to the closed sheath to set the bonding agent and thereby bond the sheath and rubber core together.

* * * * *